(12) United States Patent
Levien et al.

(10) Patent No.: US 12,710,177 B2
(45) Date of Patent: Aug. 18, 2026

(54) GRIDDLE WITH TEMPERATURE CONTROLLER

(71) Applicant: Loco—Crazy Good Cookers, Inc., Columbus, GA (US)

(72) Inventors: Blake Levien, Columbus, GA (US); Mcdonald Plummer, Columbus, GA (US)

(73) Assignee: Loco—Crazy Good Cookers, Inc., Columbus, GA (US)

( * ) Notice: Subject to any disclaimer, the term of this patent is extended or adjusted under 35 U.S.C. 154(b) by 505 days.

(21) Appl. No.: 18/009,087

(22) PCT Filed: Jun. 8, 2021

(86) PCT No.: PCT/US2021/036421
§ 371 (c)(1),
(2) Date: Dec. 8, 2022

(87) PCT Pub. No.: WO2021/252503
PCT Pub. Date: Dec. 16, 2021

(65) Prior Publication Data

US 2023/0250966 A1 Aug. 10, 2023

Related U.S. Application Data

(60) Provisional application No. 63/036,424, filed on Jun. 8, 2020.

(51) Int. Cl.
*A47J 36/32* (2006.01)
*A23L 5/10* (2016.01)
(Continued)

(52) U.S. Cl.
CPC ................ *F24C 3/126* (2013.01); *A23L 5/15* (2016.08); *A47J 36/32* (2013.01); *A47J 37/0682* (2013.01);
(Continued)

(58) Field of Classification Search
CPC .................... A23L 5/15; A23V 2002/00; A47J 2037/0795; A47J 2202/00; A47J 36/32;
(Continued)

(56) References Cited

U.S. PATENT DOCUMENTS 2,862,667 A 12/1958 Hillebrand
3,733,027 A 5/1973 Napier
(Continued)

FOREIGN PATENT DOCUMENTS

KR 20150131857 A 11/2015

OTHER PUBLICATIONS

The International Search Report and the Written Opinion of the International Searching Authority for International Application No. PCT/US2021/036421 filed Jun. 8, 2021 (10 pages).
(Continued)

*Primary Examiner* — Avinash A Savani
(74) *Attorney, Agent, or Firm* — Polsinelli PC

(57) ABSTRACT

Implementations claimed and described herein provide system and methods for controlling griddle temperature. In one implementation, a temperature measurement of a region of a griddle top is obtained. The temperature measurement is captured using one or more sensors. A set temperature range is obtained for the region of the griddle top. The temperature measurement is compared to the set temperature range. One or more burners are adjusted based on whether the temperature measurement is within the set temperature range. The temperature of the region of the griddle top is maintained within the set temperature range using the one or more burners.

20 Claims, 12 Drawing Sheets

(51) Int. Cl.

| | |
|---|---|
| ***A47J 37/06*** | (2006.01) |
| ***A47J 37/07*** | (2006.01) |
| ***F23N 1/00*** | (2006.01) |
| ***F24C 3/12*** | (2006.01) |
| ***F24C 15/08*** | (2006.01) |
| ***G05D 23/19*** | (2006.01) |

(52) U.S. Cl.

CPC ............ *A47J 37/0713* (2013.01); *F23N 1/00* (2013.01); *F24C 15/086* (2013.01); *G05D 23/1927* (2013.01); *G05D 23/1932* (2013.01); *A23V 2002/00* (2013.01); *A47J 2037/0795* (2013.01); *A47J 2202/00* (2013.01)

(58) Field of Classification Search

CPC ......................... A47J 37/0682; A47J 37/0713; A47J 37/0611; F23N 1/00; F24C 15/086; F24C 3/126; G05D 23/1927; G05D 23/1932

USPC ............................................................ 431/12

See application file for complete search history.

(56) References Cited

U.S. PATENT DOCUMENTS

| | | | | |
|---|---|---|---|---|
| 4,715,356 | A | 12/1987 | Reynolds | |
| 4,724,823 | A | 2/1988 | Simpson | |
| 6,145,431 | A * | 11/2000 | Tippmann | A47J 37/067 99/422 |
| 2002/0130190 | A1 * | 9/2002 | Marbach | F23N 5/022 236/20 R |
| 2007/0113838 | A1 * | 5/2007 | Czajka | F24C 3/124 126/273 R |
| 2009/0235918 | A1 | 9/2009 | Espina et al. | |
| 2009/0242546 | A1 * | 10/2009 | Yungbluth | H05B 3/68 219/448.11 |
| 2010/0132692 | A1 | 6/2010 | Shaffer | |
| 2018/0328591 | A1 * | 11/2018 | Eggers | F24C 15/105 |
| 2018/0340691 | A1 * | 11/2018 | Cadima | F24C 3/08 |
| 2018/0353005 | A1 | 12/2018 | Lee et al. | |
| 2019/0110641 | A1 | 4/2019 | Lee et al. | |

OTHER PUBLICATIONS

Apr. 14, 2025—(CN) Office Action—App 2021800599302, 13 Pages.

Nov. 13, 2025—(CN) Office Action—App 202180059930.2, 19 Pages.

* cited by examiner

GRIDDLE WITH TEMPERATURE CONTROLLER

CROSS-REFERENCE TO RELATED APPLICATION

This application claims the benefit of U.S. Provisional Patent Application No. 63/036,424, filed in the U.S. Patent and Trademark Office on Jun. 8, 2020, which is incorporated herein by reference in its entirety for all purposes.

FIELD

The present disclosure relates generally to a griddle. In at least one example, the present disclosure relates to a griddle with a temperature controller.

BACKGROUND

Barbequing is a popular and pervasive tradition in much of the world. A barbeque grill is a device for cooking food by applying heat directly below a grill. There are several varieties of grills but most fall into one of two categories: gas fueled or charcoal. Gas fueled grills can use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

Griddles are cooking devices with a broad flat surface that can be heated using a variety of means and may be used in both residential and commercial applications for a variety of cooking operations. The griddle is most commonly a flat metal plate composed of cast or wrought iron, aluminum or carbon steel. Griddles are commonly heated directly or indirectly by open flame and/or electrical elements. However, achieving and maintaining a desired temperature on a griddle remains challenging. These challenges are exacerbated where different temperatures at different regions of the griddle are involved. It is with these observations in mind, among others, that various aspects of the present disclosure were conceived and developed.

SUMMARY

Implementations described and claimed herein address the foregoing by providing systems and methods for controlling griddle temperature. In one implementation, a temperature measurement of a region of a griddle top is obtained. The temperature measurement is captured using one or more sensors. A set temperature range is obtained for the region of the griddle top. The temperature measurement is compared to the set temperature range. One or more burners are adjusted based on whether the temperature measurement is within the set temperature range. The temperature of the region of the griddle top is maintained within the set temperature range using the one or more burners.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

Implementations of the present technology will now be described, by way of example only, with reference to the attached figures, wherein.

DETAILED DESCRIPTION

Figure 1A:
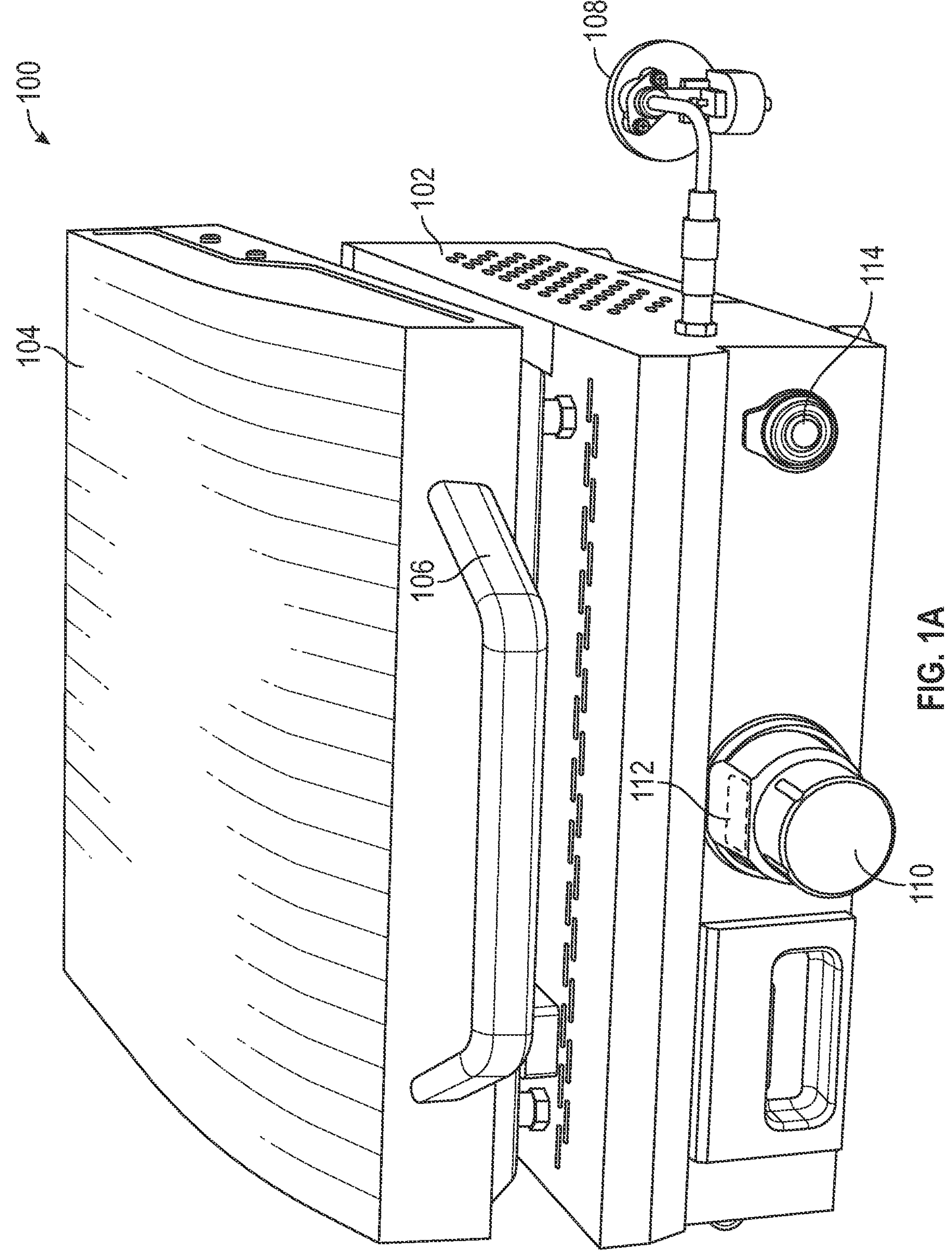
FIG. 1A is a schematic diagram of an exemplary griddle according to the present disclosure.
Figure 1B:
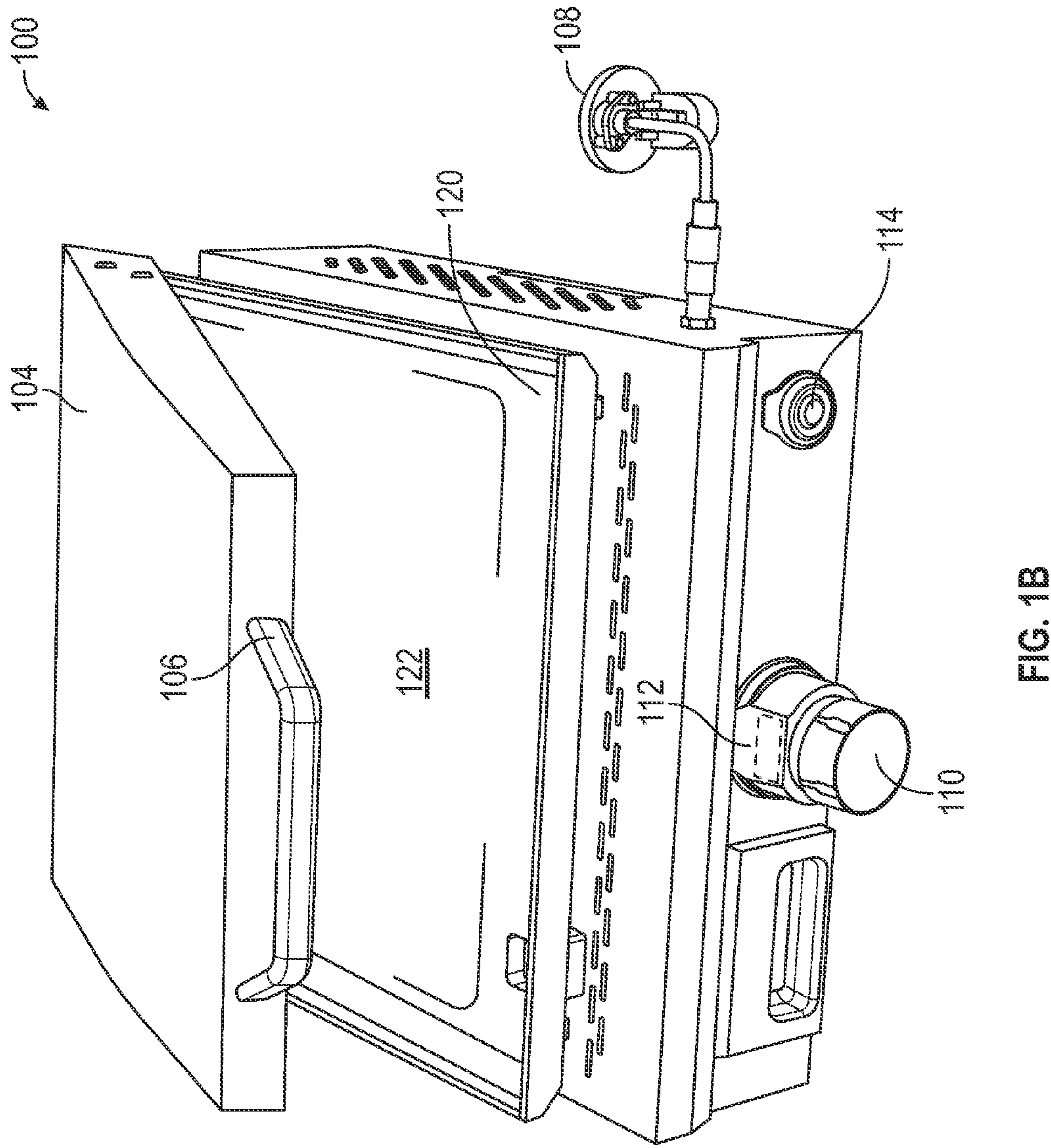
FIG. 1B is a schematic diagram of the griddle of FIG. 1A with the cover open to expose the griddle top.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

This disclosure includes a griddle operable to control the temperature for individual region(s) of a griddle top. The griddle can include one or more burners operable to heat corresponding region(s) of the griddle top. One or more sensors are operable to obtain a temperature measurement of the region(s) of the griddle top. A controller receives the temperature measurement of each region of the griddle top, determines whether the temperature measurement is within a set temperature range, and adjust the burners to maintain the temperature of the region(s) of the griddle top within the corresponding set temperature range.

The griddle is able to fine tune the heat emitted from burners for each adjacent region to accurately maintain the temperature for each region at its individual set temperature range. Accordingly, cooking can be done with predictable and consistent results.

As illustrated in FIGS. 1A-1D, a griddle 100 is operable to cook a variety of items. The exemplary griddle 100 as illustrated in FIGS. 1A-1D can be placed on a surface such as a table top, a countertop, and/or the floor. The griddle 100 includes a body 102 which is operable to contain components of the griddle 100 and/or other supplies as discussed in more detail herein. The griddle 100 includes a griddle top 120 which is operable to receive a variety of foods to be cooked upon. The griddle top 120 can include broad flat surface that can be heated using a variety of means for a variety of cooking operations. In some examples, the griddle top 120 can include a flat metal plate composed of, for example, cast iron, wrought iron, aluminum, and/or carbon steel.

In at least one example, the griddle 100 can include a lid 104 operable to cover the griddle top 120. The lid 104 can help keep the griddle top 120 clean by preventing debris and/or dust from settling on the griddle top 120. The lid 104 can also help hold in heat within the griddle 100 to help cook the food, for example similar to an oven. In some examples, as illustrated in FIGS. 1A-1D, the lid 104 can include a handle 106 to assist the user in lifting the lid 104.

Figure 3A:
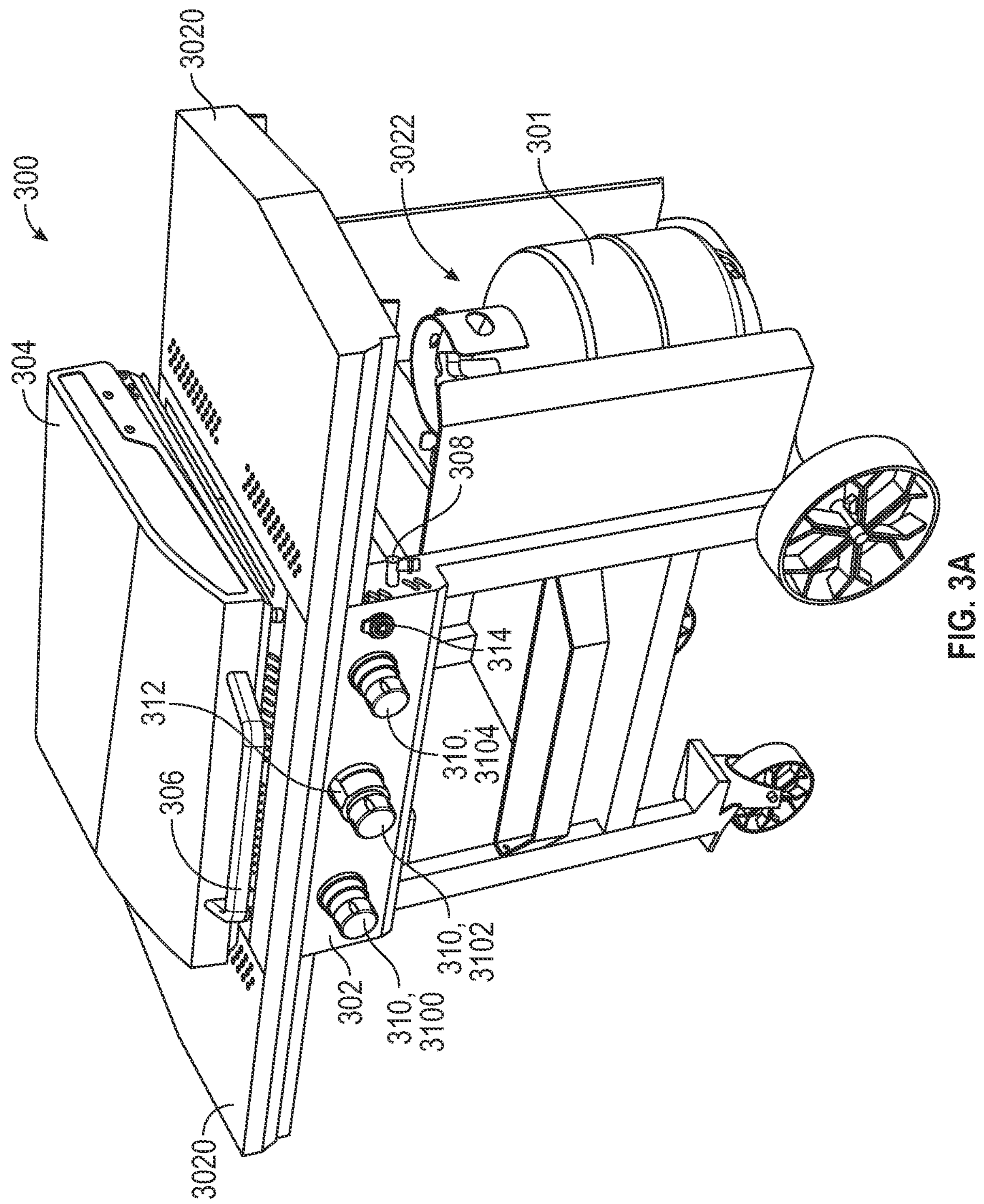
FIG. 3A is a schematic diagram of another exemplary griddle according to the present disclosure.
Figure 3B:
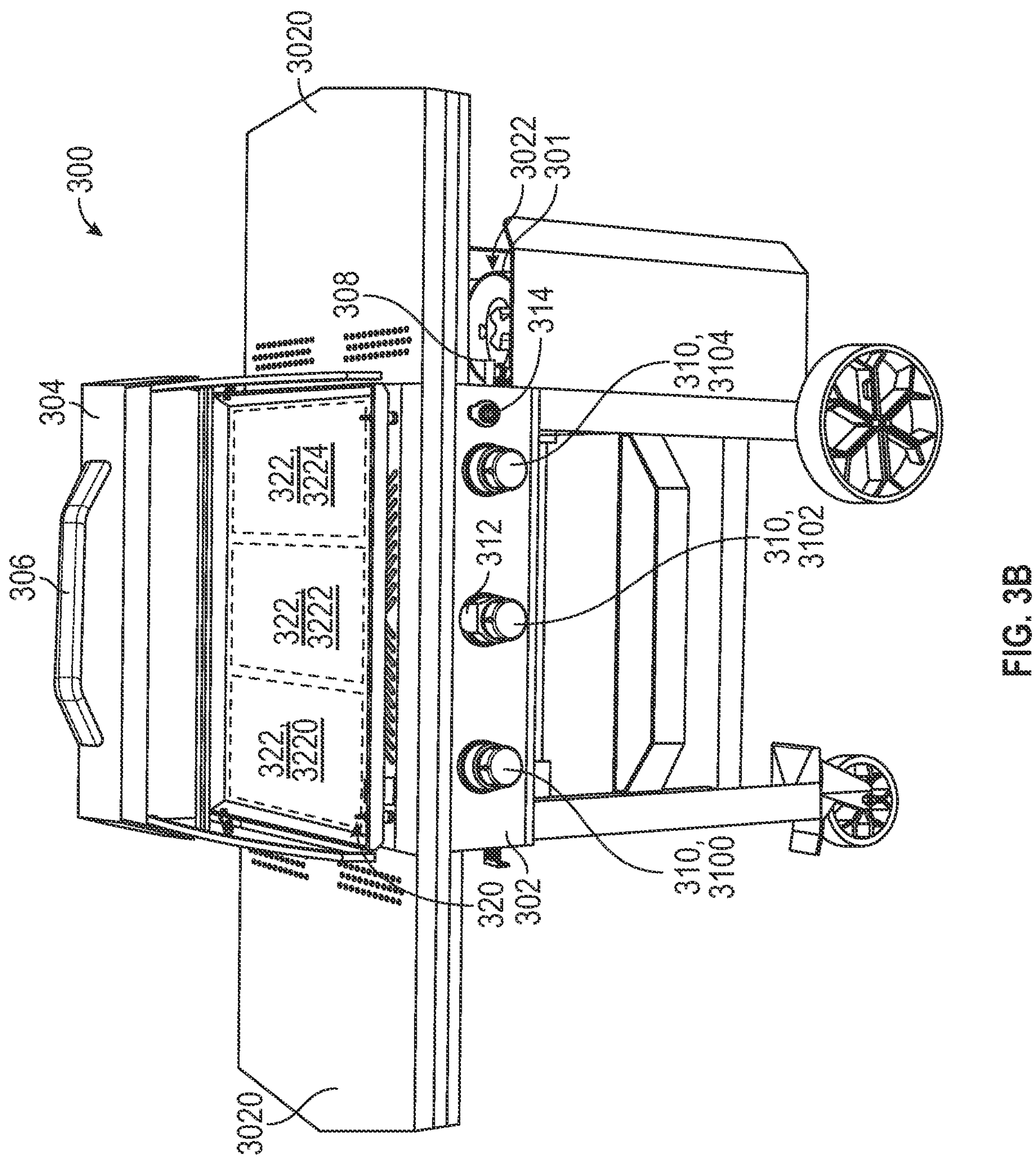
FIG. 3B is a schematic diagram of the griddle of FIG. 3A with the cover open to expose the griddle top.
Figure 3C:
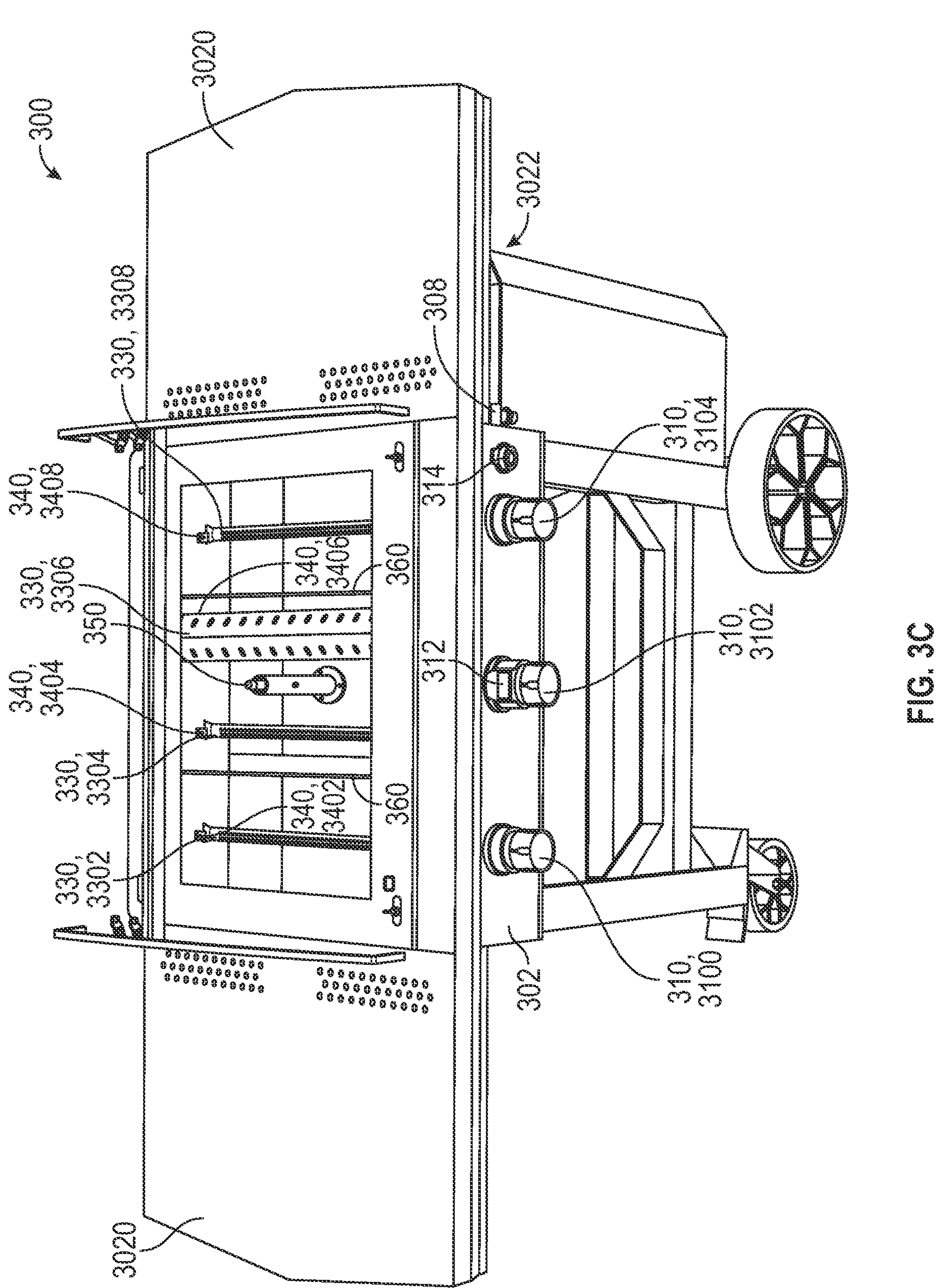
FIG. 3C is a schematic diagram of the griddle of FIG. 3A with the griddle top omitted.

The griddle 100 can include a regulator 108 operable to fluidly couple with an energy source (not shown). The energy source can include, for example, a gas tank (for example gas tank 201 as shown in FIGS. 3A-3C) and/or a gas line. The gas, such as liquid propane and/or natural gas, can pass through the regulator 108 to the one or more burners 130. To begin the fire, an igniter 114 can create a spark to ignite the gas flowing through the burners 130.

Figure 1C:
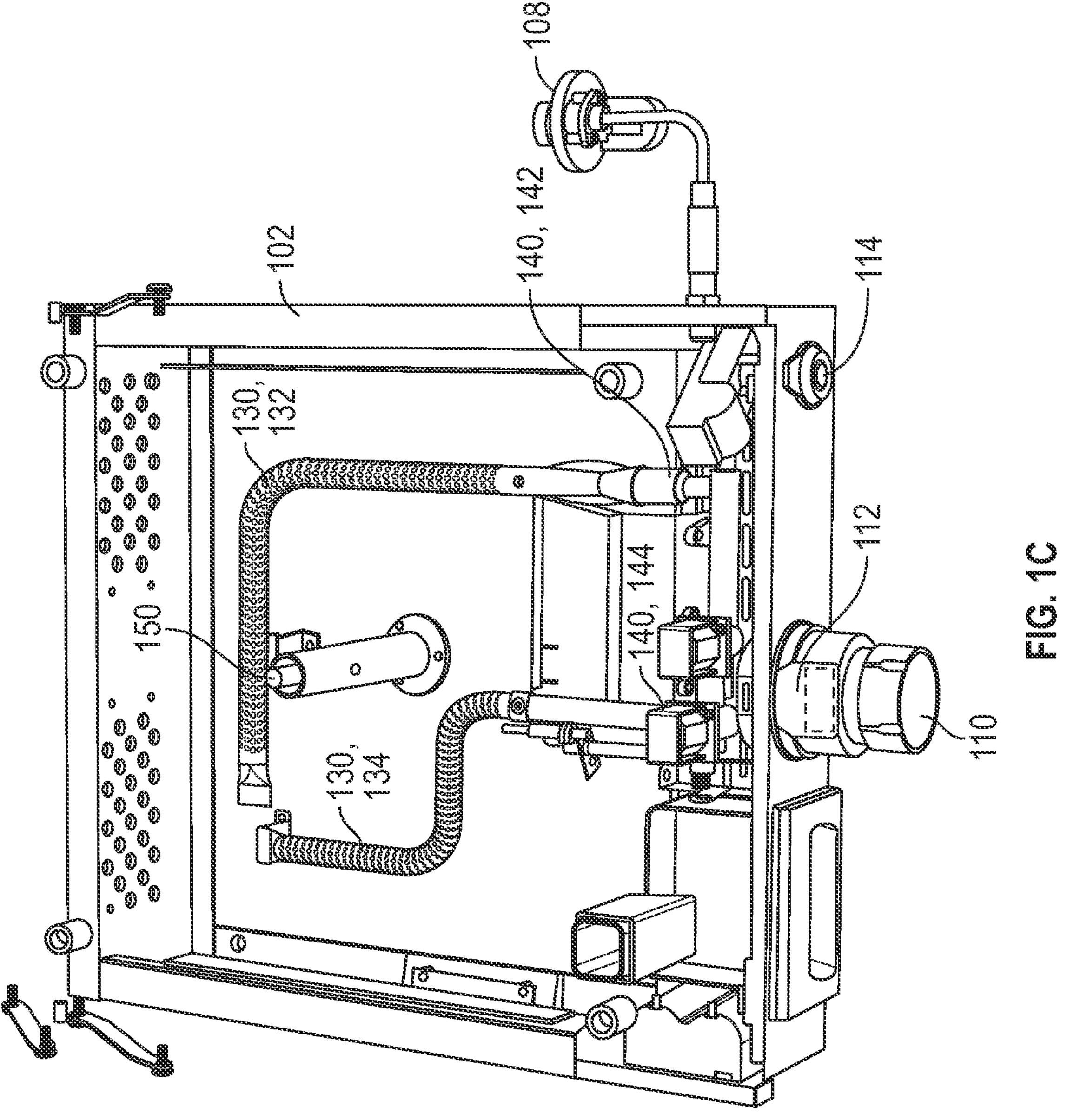
FIG. 1C is a schematic diagram of the griddle of FIG. 1A with the griddle top omitted.

The burners 130 are operable to heat a corresponding region 122 of the griddle top 120. As illustrated in FIG. 1C, the burners 130 can include two burners 132, 134 that together are operable to deliver heat to the region 122 of the griddle top 120. The burners 130 are able to control the fire and/or the temperature of the region 122 of the griddle top 120 by controlling the amount gas that passes through the burners 130. The griddle 100 includes one or more valves 140 in communication with the burners 130. Each of the valves 140 controls gas flow to a corresponding burner 130. The burners 130 can be adjusted by adjusting an amount that the one or more valves 140 is open. For example, as the temperature of the griddle top 120 needs to be increased, the valves 140 may transition to a more open configuration to allow more gas to flow through the burner 130. The valves 140 may open from a closed configuration to a fully open configuration. In some examples, the valves 140 may open from a lower percentage (e.g., 20%) to a higher percentage (e.g., 70%) to control the gas flow and subsequently the flame and temperature of the region 122 of the griddle top 120. Similarly, when the temperature of the griddle top 120 needs to be decreased, the valves 140 may transition to a more closed configuration to allow more gas to flow through the burner 130. The valves 140 may close from a fully open configuration to a fully closed configuration. In some examples, the valves 140 may close from a higher percentage (e.g., 70%) to a lower percentage (e.g., 20%) to control the gas flow and subsequently the flame and temperature of the region 122 of the griddle top 120.

By having two or more burners 132, 134 operable to deliver heat to the same region 122 of the griddle top 120, the temperature of the region 122 of the griddle top 120 can be more finely controlled. For example, one burner 132 can be considered a starter burner which can provide a very low flame and heat. In some examples, the starter burner 132 may not turn off until the entire griddle 100 is turned off. In some examples, the starter burner 132 may be utilized to ignite the one or more other burners 134. As the temperature of the region 122 of the griddle top 120 needs to be increased, the one burner 132 may provide more heat by opening the corresponding valve 142 until the desired temperature is reached. In some examples, as a higher temperature of the griddle top 120 is desired, the one burner 132 may not be able to sufficiently heat the region 122 of the griddle top 120, and the second burner 134 begins delivering heat. In some examples, to provide more uniform heat across the region 122 of the griddle top 120, both burners 132, 134 may be controlled equally by opening and/or closing the valves 142, 144 the same amount. To decrease the heat, the opposite may occur, by controlling how much the valves 142, 144 are closed and in a specific arrangement.

Figure 1D:
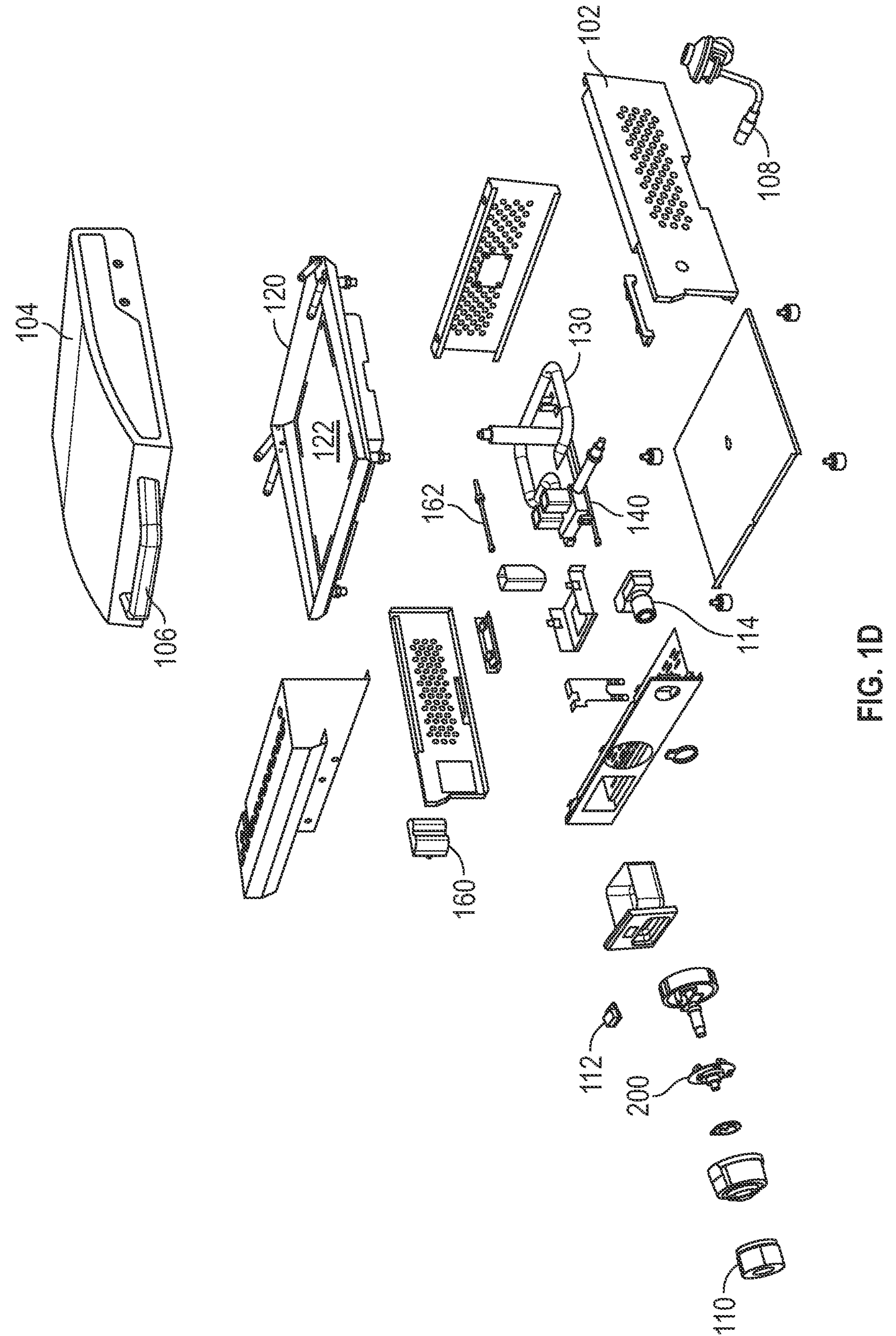
FIG. 1D is an exploded view of griddle of FIG. 1A.

In some examples, as illustrated in FIG. 1D, the griddle 100 may include one burner 130 which can have a shape as to deliver heat throughout the region 122 of the griddle top 100. For example, the burner 130 can have substantially a U-shape.

In at least one example, the burners 130 may be operable to heat the region 122 of the griddle top 120 between 250 degrees Fahrenheit and 500 degrees Fahrenheit. In at least one example, the burners 130 may emit up to 40,000 BTU. In some examples, the burners 130 may be operable to heat the region 122 of the griddle top 120 from 250 degrees Fahrenheit to over 500 degrees Fahrenheit. In some examples, the burners 130 may be controlled to heat the region 122 of the griddle top 120 in 50 degree Fahrenheit intervals, alternatively 30 degree Fahrenheit intervals, alternatively 20 degree Fahrenheit intervals, alternatively 10 degree Fahrenheit intervals, alternatively 5 degree Fahrenheit intervals, alternatively 1 degree Fahrenheit intervals.

The griddle 100 is operable to maintain the desired set temperature of the region 122 of the griddle top 120. The griddle 100 includes an input component 110 which is operable to receive input from a user to set the desired set temperature for the region 122 of the griddle top 122. As illustrated in FIGS. 1A-1D, the input component 110 includes a knob which is operable to be turned to the desired setting. In some examples, the input component 110 can include one or more buttons. In some examples, the input component 110 can include a portable device such as a smart phone, laptop, computer, and/or tablet which is communicatively coupled with the griddle 100 such that the user can control and/or monitor the griddle 100 through the portable device. In some examples, the set temperature can be an exact temperature. In some examples, the set temperature can be a temperature range which is within an acceptable tolerance to accurately cook the food as desired. In some examples, the portable device can be communicatively coupled with the griddle 100 either by wired communication and/or wireless communication, such as Bluetooth, WiFi, or any other suitable mechanism.

The griddle 100 includes one or more sensors 150 operable to measure a temperature measurement of the region 122 of the griddle top 120 corresponding with the one or more burners 130. The one or more sensors 150 can include a central sensor 150 which is operable to measure a center of the region 122 of the griddle top 120. In some examples, additional sensors 150 can be included to measure different areas of the region 122 of the griddle top 120 to provide a more accurate temperature measurement of the region 122 of the griddle top 120. As illustrated in FIGS. 1A-1D, the sensors 150 are positioned within the body 102 of the griddle 100, underneath the griddle top 120. The sensors 150 can be positioned to measure the underside of the griddle top 120 to obtain a temperature measurement of the region 122 of the griddle top 120. In some examples, the sensors 150 may be positioned above the griddle top 120, in line with the griddle top 120, or any other suitable position to obtain a temperature measurement of the griddle top 120. In some examples, the sensors 150 may be in direct contact with the griddle top 120. In some examples, the sensors 150 may indirectly obtain a temperature measurement of the griddle top 120, for example with infrared technology.

In at least one example, a display 112 can be operable to present, to the user, the set temperature range and/or the temperature measurement for the region 122 of the griddle top 120. As illustrated in FIGS. 1A-1D, the display 112 can be disposed on the griddle 100. For example, as illustrated in FIGS. 1A-1D, the display 112 can be proximate the input component 110. In some examples, the display 112 can be on a portable device, such as a smartphone, smartwatch, computer, and/or the like, such that the user can monitor and/or control the griddle 100 using an application. With the display 112 showing the set temperature range and/or the temperature measurement for the region 122 of the griddle top 120, the user can determine whether the griddle 100 is cooking the food or is ready to cook the food as desired.

In at least one example, the griddle 100 can include a battery 160 operable to provide power to the griddle 100, for example to provide power to the sensors 150, igniter 114, and/or the display 112. In some examples, the battery 160 can include a connector plug into a power plug. As illustrated in FIG. 1D, the battery 160 can be communicatively coupled with a thermocouple 162. The thermocouple 162 can be operable to convert heat to electric power. The thermocouple 162 can provide power to the battery 160 such that the battery 160 is recharged via the thermocouple 162.

A controller 200 is in communication with components of the griddle 100, for example the input component 110, the display 112, the burners 130, the valves 140, and/or the sensors 150. The controller 200 is operable to receive data and/or input from the components of the griddle 100 and make adjustments to the component(s) of the griddle 100 as needed such that the griddle 100 operates as desired. For example, the controller 200 can be operable to receive, for example from the sensors 150, the temperature measurement of the region 122 of the griddle top 120. The controller 200 can then determine whether the temperature measurement is within the set temperature provided by the user via the input component 110. The controller 200 can then adjust the one or more burners 130, based on the temperature measurement, to maintain the temperature of the region 122 of the griddle top 120 within the set temperature range. For example, the controller 200 can adjust the amount that the one or more corresponding valves 140 is open. In some examples, the controller 200 can adjust the burners 130 automatically without user assistance or input. Accordingly, the user can be assured that the region 122 of the griddle top 120 is at the set desired temperature without needing to constantly check in and/or adjust the griddle 100. Cooking the food then becomes much more simple and predictable for the user to provide consistent results.

Figure 2:
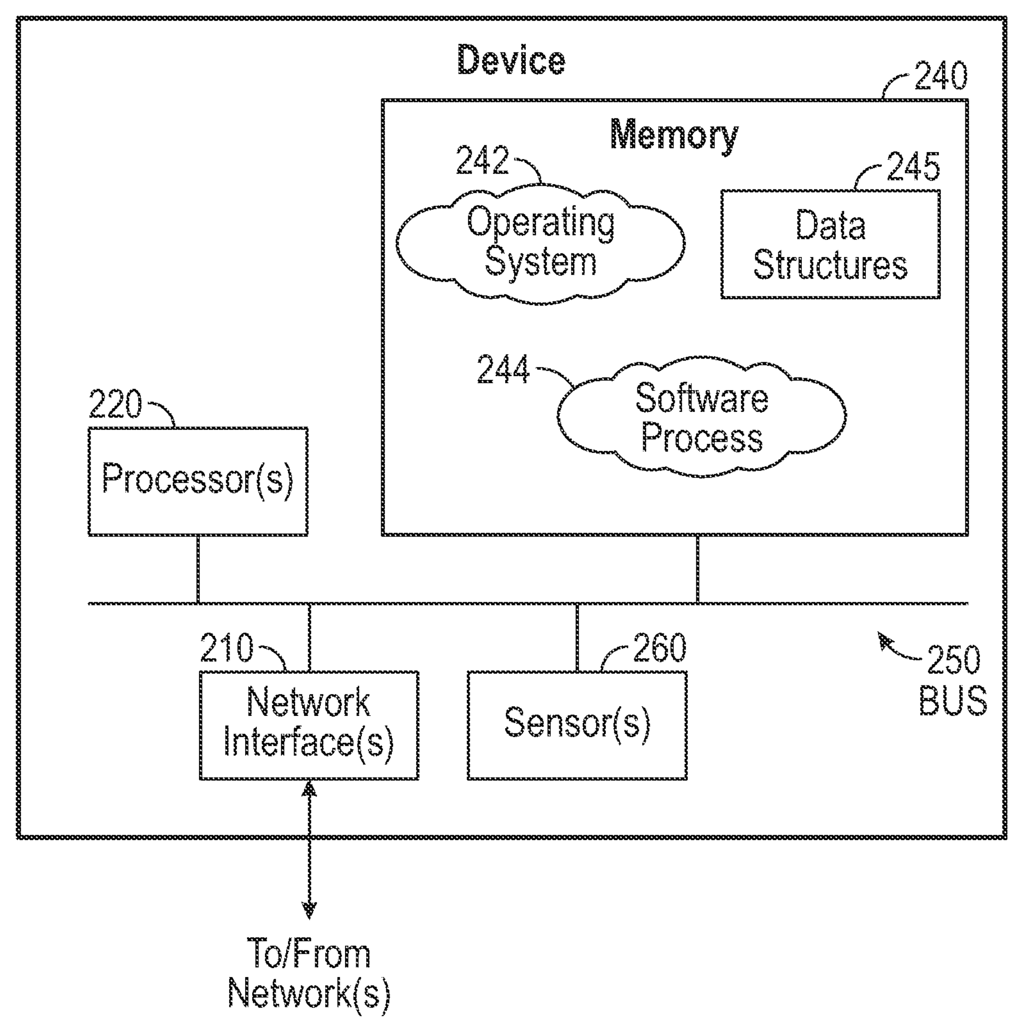
FIG. 2 is a schematic diagram of a controller.

FIG. 2 is a block diagram of an exemplary controller 200. Controller 200 is configured to perform processing of data and communicate with the sensors 150, 350, 450, for example as illustrated in FIGS. 1A-1C and 3A-5. In operation, controller 200 communicates with one or more of the above-discussed components and may also be configured to communication with remote devices/systems.

As shown, controller 200 includes hardware and software components such as network interfaces 210, at least one processor 220, sensors 260 and a memory 240 interconnected by a system bus 250. Network interface(s) 210 can include mechanical, electrical, and signaling circuitry for communicating data over communication links, which may include wired or wireless communication links. Network interfaces 210 are configured to transmit and/or receive data using any variety of different communication protocols.

Processor 220 represents a digital signal processor (e.g., a microprocessor, a microcontroller, or a fixed-logic processor, etc.) configured to execute instructions or logic to perform tasks. Processor 220 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 220 typically operates in conjunction with shared or dedicated hardware, including but not limited to, hardware capable of executing software and hardware. For example, processor 220 may include elements or logic adapted to execute software programs and manipulate data structures 245, which may reside in memory 240.

Sensors 260, which may include sensors 150, 350, 450 as disclosed herein, typically operate in conjunction with processor 220 to perform measurements, and can include special-purpose processors, detectors, transmitters, receivers, and the like. In this fashion, sensors 260 may include hardware/software for generating, transmitting, receiving, detection, logging, and/or sampling magnetic fields, seismic activity, and/or acoustic waves, or other parameters.

Memory 240 comprises a plurality of storage locations that are addressable by processor 220 for storing software programs and data structures 245 associated with the embodiments described herein. An operating system 242, portions of which may be typically resident in memory 240 and executed by processor 220, functionally organizes the device by, inter alia, invoking operations in support of software processes and/or services 244 executing on controller 200. These software processes and/or services 244 may perform processing of data and communication with controller 200, as described herein. Note that while process/service 244 is shown in centralized memory 240, some examples provide for these processes/services to be operated in a distributed computing network.

Other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 220 or computer readable medium encoded with instructions for execution by processor 220 that, when executed by the processor, are operable to cause the processor to perform the functions described herein.

Additionally, the controller 200 can apply machine learning, such as a neural network or sequential logistic regression and the like, to determine relationships between the temperature measurement(s) received by the sensors 150, 350, 450 and the operation of the burners 130 (e.g., the valves 140) to maintain the temperature of the region 122 of the griddle top 120 at the desired set temperature range. For example, a deep neural network may be trained in advance to capture the complex relationship between the operation of the burners 130 and/or valves 140 and the temperature of the region 122 of the griddle top 120. As such, the temperature of the region 122 of the griddle top 120 can be maintained more accurately. The controller 200 may be part of a portable device, such as a smartphone, smartwatch, computer, user device, and/or the like and/or form part of or otherwise be integrated with the griddle 100. Such a portable device may further communicate with the controller 200 over a wired or wireless (e.g., network, Bluetooth, etc.) connection to control the griddle 100. For example, a server may host an application and be in communication with one or more portable devices and one or more griddles 100 over a network to control the griddles 100 using the application. A user may specify a set temperature range, view current temperatures, view and set timers, view a condition of the griddles 100, and/or the like through interaction with the application.

While FIGS. 1A-1D illustrated an example of a griddle top 100 with only one region 122 of the griddle top 120, in some examples, as illustrated in FIGS. 3A-4C, more than one region 322, 422 may be present in one griddle top 120. Similar reference numbers of components between the figures correspond with similar features and/or components throughout the disclosure.

FIGS. 3A-3C illustrate an exemplary griddle 300 with three regions 322 of the griddle top 320. In some examples, as illustrated in FIGS. 3A-3C, the body 302 of the griddle 300 can include a cart-like structure operable to hold and/or store items for cooking. In at least one example, as illustrated in FIGS. 3A-3C, the griddle 300 can include a gas storage 2022 operable to receive and contain a gas source, such as a gas tank 201. In some examples, the body 202 can include one or more work surfaces 2020 on which the user can prep and/or place food, ingredients, tools, etc. As illustrated in FIGS. 3A-3C, the griddle 300 can include two work surfaces 2020, one disposed on each side of the griddle top 220.

As shown in FIGS. 3B, the griddle top 320 can include a plurality of regions 322, for example three regions 322. Each of the regions 322 may be controlled independently to be set at different set temperatures and/or settings. For example, as illustrated in FIGS. 3B and 3C, regions 3220, 3224 are controlled by corresponding input components 3100, 3104, while region 3222 is controlled by corresponding input component 3102. In the example as illustrated in FIGS. 3A-3C, region 3222 includes one or more sensors 350 to obtain a temperature measurement of region 3222. Input component 3102 can be manipulated by the user to input the set temperature range desired for region 3222. The controller 200 receives the temperature measurement of region 3222 of the griddle top 320, and, based on the temperature measurement, adjusts the one or more burners 3304, 3306 corresponding with region 3222. As shown in FIG. 3C, the burners 330 associated with region 322 include two burners 3304, 3306. In other examples, one or more than two burners 330 may be utilized to heat one corresponding region 322 of the griddle top 320. The burners 3304, 3306 are adjusted together via corresponding valves 3404, 3406 to control the flame and temperature of the corresponding region 3222 of the griddle top 320. In at least one example, the burner 3304 can function as a starter burner while the burner 3306 can be an additional burner.

The controller 200 can adjust the burners 3304, 3306, based on the temperature measurement from the sensors 350, to maintain the temperature of the corresponding region 3222 of the griddle top 320. In some examples, maintenance of the temperature of the desired region 3222 within the set temperature range may be difficult due to regions 320 adjacent to the region 3222. As illustrated in FIG. 3C, the griddle 300 includes two regions 3220, 3224 adjacent to each side of the region 3222. The regions 3220, 3224 may affect the temperature and corresponding heat from the burners 3304, 3306 needed to maintain the temperature of region 3222 within the desired set temperature range input via the input component 3102. Accordingly, the controller 200 performs calculations based on the temperature measurements and is operable to make automatic adjustments (e.g., without user input or assistance) to the burners 3304, 3306 (e.g., via valves 3404, 3406) to maintain the temperature of region 3222 within and/or at the set temperature range.

As illustrated in FIGS. 3A-3C, the regions 3220, 3224 are analog/conventional. For example, the regions 3220, 3224 are not controlled by temperature but simply by analog settings for the burners 3302, 3308 such as low, medium, high heat. With such a system, the temperature control of regions 3220, 3224 of the griddle top 320 are not accurately maintained. Operation of the regions 3220, 3224 can greatly affect the maintenance of the temperature of region 3222. Accordingly, the controller 200 is operable to finely tune the operation of the burners 3304, 3306 corresponding with region 3222 to maintain the temperature of region 3222 at the set temperature range. For example, region 3220 may be set on low while region 3224 may be set on high. The temperature of region 3220 is much lower than region 3224. Accordingly, the controller 200 may adjust burner 3304 to emit a greater flame than burner 3306 so that the region 3222 is at a consistent temperature and maintained within the set temperature range. Additionally, in some examples, if region 3224 is set at high which causes region 3224 to be at a higher temperature than the set temperature range for region 3222, the controller 200 may adjust the burners 3304, 3306 to emit a lesser flame so that the region 3222 is maintained within the set temperature range.

In some examples, as illustrated in FIG. 3C, the griddle 300 may include shield components 360 positioned between burners 330 for each region 322 of the griddle top 320 to reduce the affect that the flame from the burners 330 from one region 322 may have on the temperature of an adjacent region 322. The shield components 360 may be made of a heat resistant material and/or have low heat transfer properties.

Figure 4A:
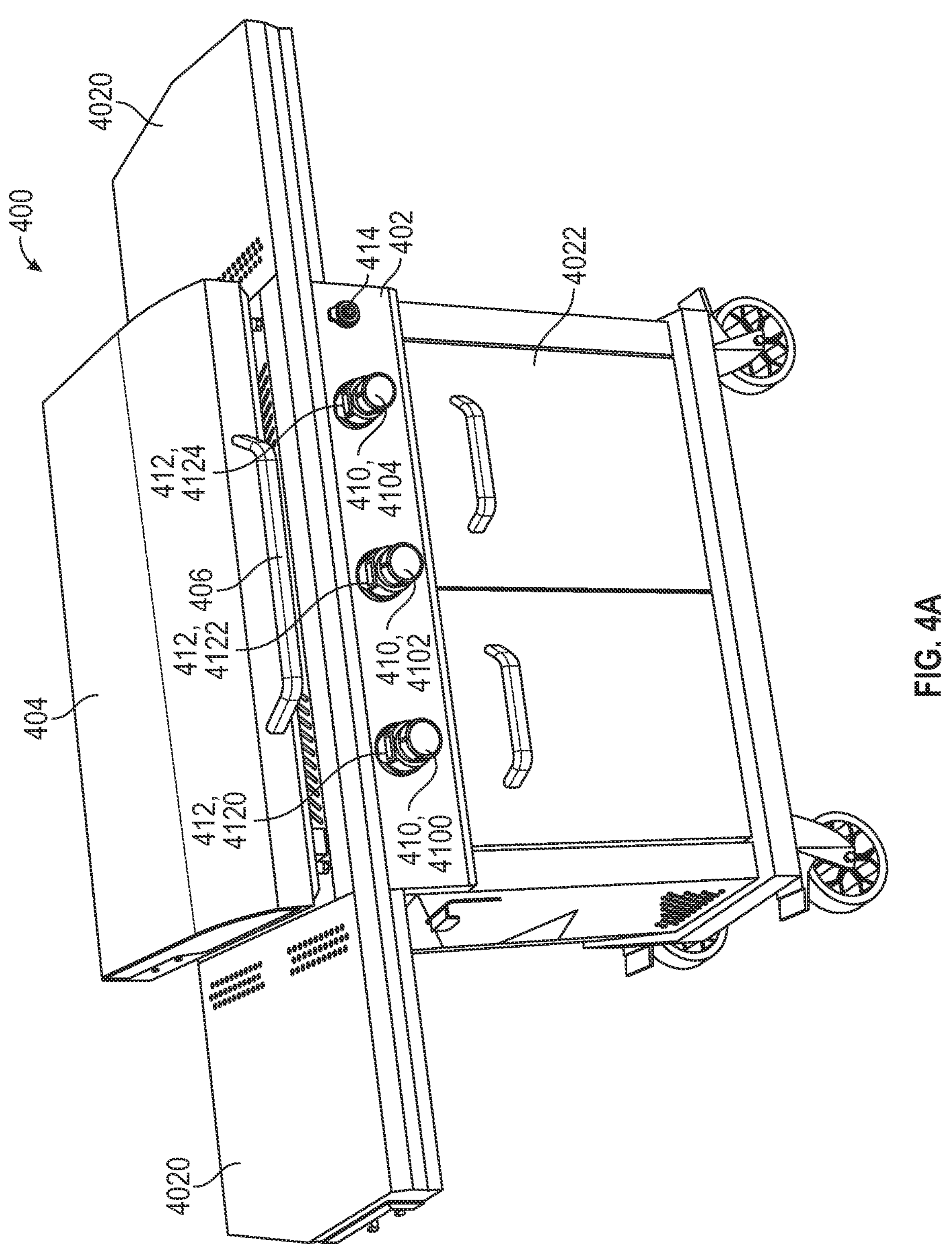
FIG. 4A is a schematic diagram of another exemplary griddle according to the present disclosure.
Figure 4B:
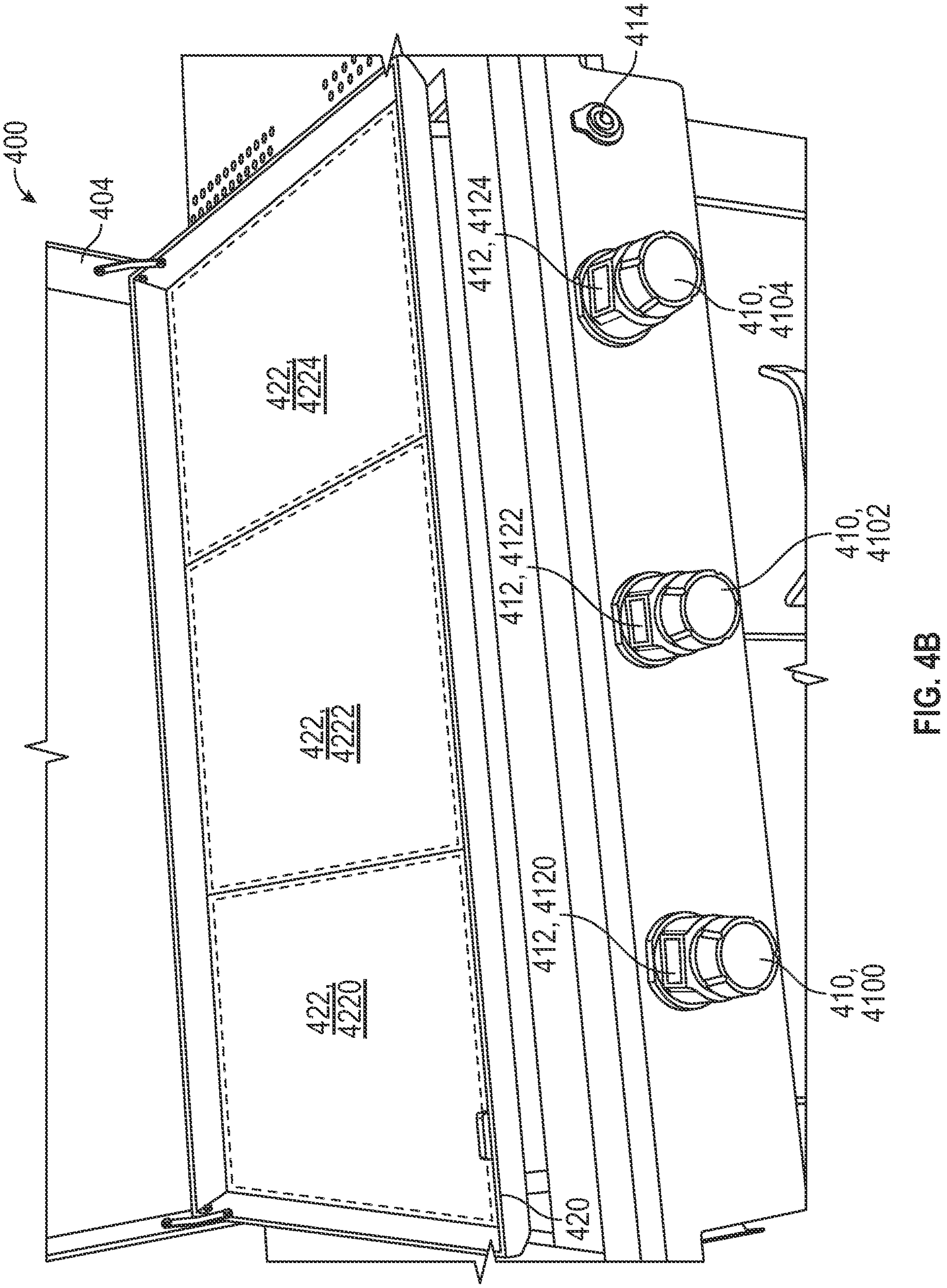
FIG. 4B is a schematic diagram of the griddle of FIG. 4A with the cover open to expose the griddle top.
Figure 4C:
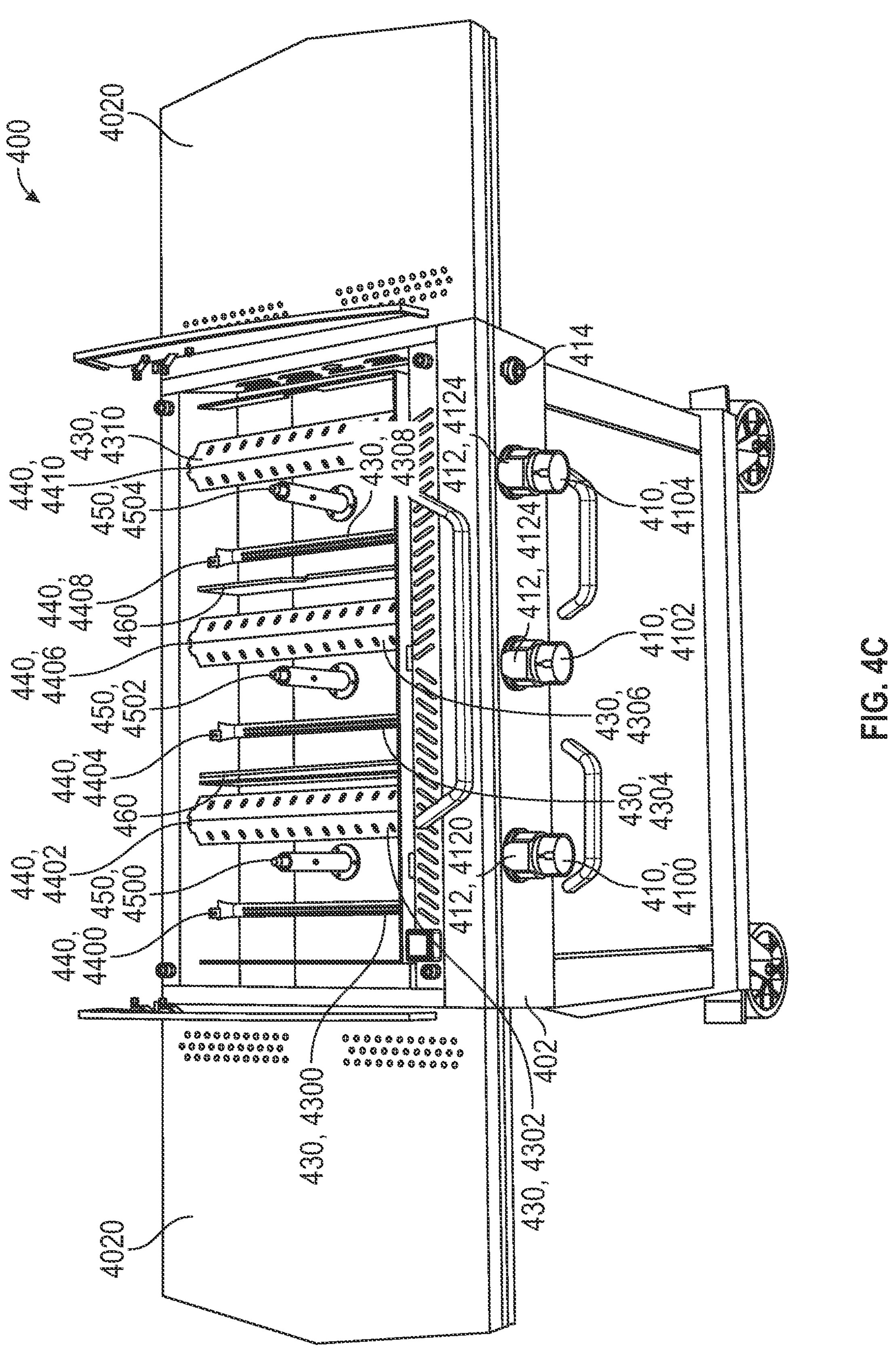
FIG. 4C is a schematic diagram of the griddle of FIG. 4A with the griddle top omitted.

FIGS. 4A-4C illustrate a griddle 400 with three regions 422 of the griddle top 420, and each of the three regions 422 are temperature controlled by a controller 200. While the disclosure discusses one controller 200 operating each of the regions 422, in some examples, a plurality of controllers 200 may be utilized to control the operation of the griddle 400 in any combination with the number of regions 422. As illustrated in FIGS. 4A-4C, the body 402 of the griddle 400 can include a cabinet that can be enclosed.

In at least one example, as illustrated in FIGS. 4A-4C, each of the regions 422 may be controlled independently to be set at different set temperatures and/or settings. For example, as illustrated in FIGS. 4B and 4C, regions 4220, 4222, 4224 are controlled by corresponding input components 4100, 4102, 4104. As illustrated in FIGS. 4A-4C, the griddle 400 includes three separate displays 4120, 4122, 4124 corresponding with the regions 4220, 4222, 4224 and the input components 4100, 4102, 4104. In other examples, one display 412, or any other desired number of displays 412, may be employed to present the set temperature range and/or the temperature measurement for each region 422 of the griddle top 420.

In the example as illustrated in FIGS. 4A-4C, regions 4220, 4222, 4224 includes one or more sensors 4500, 4502, 4504 corresponding with each region 4220, 4222, 4224 to obtain a temperature measurement of each region 4220, 4222, 4224. Input components 4100, 4102, 4104 can be manipulated independently from one another by the user to input the set temperature range desired for each corresponding region 4220, 4222, 4224. The controller 200 receives the temperature measurement of each region 4220, 4222, 4224 of the griddle top 420, and, based on the temperature measurement(s), adjusts the one or more burners 430 corresponding with each region 4220, 4222, 4224. For example, as illustrated in FIGS. 4C, region 4220 corresponds with burners 4300, 4302, region 4222 corresponds with burners 4304, 4306, and region 4224 corresponds with burners 4308, 4310. As shown in FIG. 4C, the burners 430 associated with each region 422 include two burners 430 (e.g., burners 4300, 4302 corresponds with region 4220). In other examples, one or more than two burners 430 may be utilized to heat one corresponding region 422 of the griddle top 420. The burners 430 are adjusted together via corresponding valves 440 to control the flame and temperature of the corresponding region 422 of the griddle top 420. For example, valves 4400, 4402, 4404, 4406, 4408, 4410 control gas flow to corresponding burners 4300, 4302, 4304, 4306, 4308, 4310. In at least one example, the burners 4300, 4304, 4308 can function as starter burners while the burners 4302, 4306, 4310 can be additional burners for each corresponding regions 4220, 4222, 4224.

The controller 200 can adjust each of the burners 430, based on the temperature measurement from the sensors 450 for each corresponding region 422, to maintain the temperature of the corresponding region 422 of the griddle top 420. For example, maintenance of the temperature of a desired region 422 (e.g., region 4222) within the set temperature range for that region 422 may be difficult due to operation of the regions 4220, 4224 adjacent to the region 4222. As illustrated in FIG. 4C, the griddle 400 includes two regions 4220, 4224 adjacent to each side of the region 4222. The regions 4220, 4224 may affect the temperature and corresponding heat from the burners 4304, 4306 needed to maintain the temperature of region 4222 within the desired set temperature range input via the input component 4102. Accordingly, the controller 200 performs calculations based on the temperature measurements and is operable to make automatic adjustments (e.g., without user input or assistance) to the burners 430 and/or valves 440 to maintain the temperature of region 4222 within and/or at the set temperature range. In maintaining the temperature of region 4222 within and/or at the set temperature range, the controller 200 may adjust the burners 430 and/or valves 440 corresponding with region 4222 and/or the burners 430 and/or valves 440 corresponding with regions 4220, 4224.

As each of the regions 4220, 4222, 4224 may be set to different set temperature ranges and/or changed to different set temperature ranges, the temperature control of regions 4220, 4222, 4224 of the griddle top 420 may be difficult to accurately maintain. For example, operation of the regions 4220, 4224 can greatly affect the maintenance of the temperature of region 4222. Accordingly, the controller 200 is operable to finely tune the operation of the each, all, and/or any combination of burners 430 to maintain the temperature of each of regions 4220, 4222, 4224 within and/or at the corresponding set temperature ranges. For example, region 4220 may be set on 250 degrees Fahrenheit, region 4222 may be set on 350 degrees Fahrenheit, and region 4224 may be set on 450 degrees Fahrenheit. The heat from each region 422 may affect the temperature for the other regions 422. For example, the heat from region 4224 may cause region 4222 to be at a higher temperature, so the flame from burners 4304, 4306 may need to be decreased. Accordingly, the controller 200 may adjust each, all, and/or any combination of burners 430 to keep each region 4220, 4222, 4224 is at a consistent temperature and maintained within the corresponding set temperature ranges. The controller 200 may continually make adjustments to maintain the temperatures for each region 422 at their corresponding set temperature ranges. In some examples, the controller 200 may receive temperature measurements from the sensors 450 and make adjustments at predetermined time intervals (e.g., 1 second, 5 seconds, 10 seconds).

In some examples, as illustrated in FIG. 4C, the griddle 400 may include shield components 460 positioned between burners 430 for each region 422 of the griddle top 420 to reduce the affect that the flame from the burners 430 from one region 422 may have on the temperature of an adjacent region 422. The shield components 460 may be made of a heat resistant material and/or have low heat transfer properties.

Figure 5:
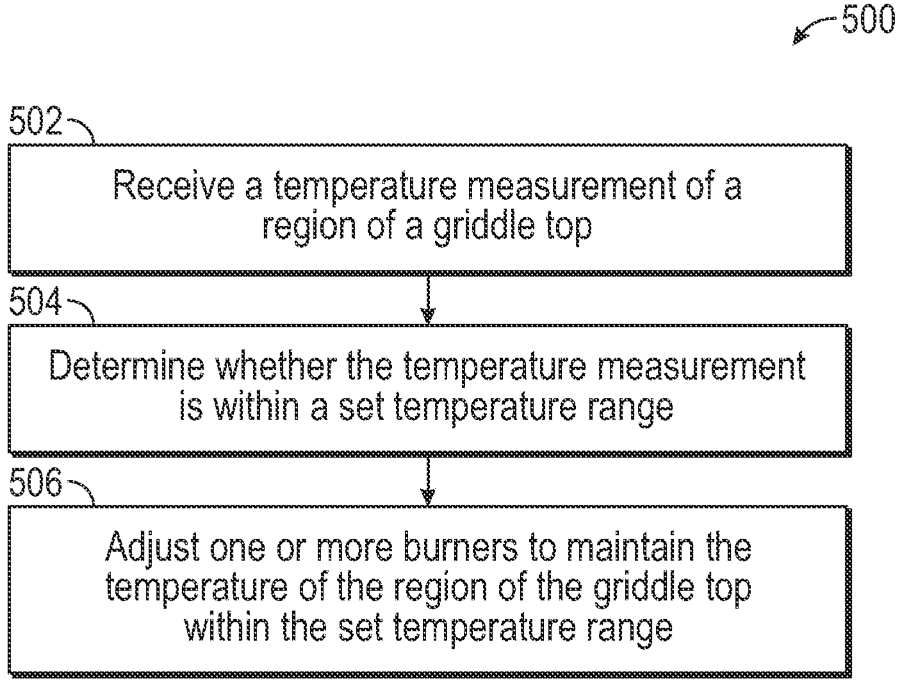
FIG. 5 is a flow chart of a method to maintain the temperature of the griddle top.

Referring to FIG. 5, a flowchart is presented in accordance with an example embodiment. The method 500 is provided by way of example, as there are a variety of ways to carry out the method. The method 500 described below can be carried out using the configurations illustrated in FIGS. 1A-4C, for example, and various elements of these figures are referenced in explaining example method 500. Each block shown in FIG. 5 represents one or more processes, methods or subroutines, carried out in the example method 500. Furthermore, the illustrated order of blocks is illustrative only and the order of the blocks can change according to the present disclosure. Additional blocks may be added or fewer blocks may be utilized, without departing from this disclosure. The example method 500 can begin at block 502.

At block 502, a temperature measurement of a region of a griddle top is received. In at least one example, the temperature measurement can be obtained by one or more sensors. In at least one example, a central sensor can be operable to measure a center of the region of the griddle top. In some examples, a plurality of sensors, including the central sensor, can measure the temperature of the region of the griddle to accurately determine the temperature of the region of the griddle top.

In at least one example, the one or more sensors may be communicatively coupled with a controller such that the controller receives the temperature measurement. In some examples, the controller may be disposed on and/or in the griddle. In some examples, the controller may be disposed in a portable device which is communicatively coupled with the griddle.

At block 504, it is determined whether the temperature measurement is within a set temperature range. In at least one example, the controller can determine whether the temperature measurement is within the set temperature range. The set temperature range may be input by a user, for example through an input component such as a knob, a portable device, and/or a button. The set temperature range may have a range of one degree Fahrenheit, five degrees Fahrenheit, or any other suitable range that is controllable by the griddle and does not greatly affect the cooking of the item on the griddle top.

At block 506, one or more burners is adjusted to maintain the temperature of the region of the griddle top within the set temperature range. In at least one example, the one or more burners may be adjusted automatically, for example without user input or assistance, by the controller. In some examples, the controller that receives the temperature measurement and the controller that adjusts the burners may be different controller. In some examples, the same controller may perform both actions.

In at least one example, adjusting the burners can include adjusting one or more valves operable to control the flow of gas to the corresponding one or more burners for the region of the griddle top. For example, opening the valve(s) may permit more gas to flow to the burners such that the flame emitted from the burners may be larger. Accordingly, the region of the griddle top increases in temperature. Closing the valve(s) may restrict the gas flow to the burners such that the flame emitted from the burners may be smaller. In some examples, a plurality of burners may corresponding with and be operable to deliver heat to the region of the griddle top. Accordingly, coordinating the adjustment of the plurality of burners can allow for greater control of the temperature of the region of the griddle top.

In at least one example, a second temperature measurement can be received of a second region of the griddle top adjacent to the region of the griddle top. It can be determined whether the second temperature measurement is within a second set temperature range for the second region. One or more second burners and/or the one or more burners can be adjusted to maintain the temperature of the region within the set temperature range and the second temperature of the second region within the second set temperature range. The heat emitted for a region of the griddle top may affect the temperature of an adjacent region of the griddle top. Accordingly, maintaining the temperatures of each region of the griddle top within the corresponding set temperature ranges can be difficult but extremely important to provide predictable and consistent cooking temperatures for each region of the griddle top.

In at least one example, the set temperature range and the temperature for the region of the griddle top can be presented to a user. In some examples, the set temperature range and the temperature for the region of the griddle top can be presented to a user via a display. In some examples, the display can be disposed on the griddle. In some examples, a plurality of displays may be utilized. In some examples, the display can be disposed on a portable device such that the griddle can be monitored and/or controlled via the portable device.

Numerous examples are provided herein to enhance understanding of the present disclosure. The disclosures shown and described above are only examples. Even though numerous properties and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A griddle comprising:

a griddle top;

a plurality of burners including one or more first burners and one or more second burners, the one or more first burners operable to heat a first region of the griddle top, the one or more second burners operable to heat a second region of the griddle top;

a plurality of valves operable to control gas flow from one or more gas sources to the plurality of burners, the plurality of valves including one or more first valves and one or more second valves;

one or more sensors operable to capture a first temperature measurement of the first region of the griddle top and a second temperature measurement of the second region of the griddle top; and a controller operable to:

receive the first temperature measurement of the first region of the griddle top and the second temperature measurement of the second region of the griddle top;

determine whether the first temperature measurement is within a first set temperature range and whether the second temperature measurement is within a second set temperature range for the second region; and maintain a first temperature of the first region of the griddle top within the first set temperature range and a second temperature of the second region within the second set temperature range by adjusting at least one of the one or more first valves or the one or more second valves between an open position and a closed position to control the gas flow supplied to at least one of the one or more first burners based on the first temperature measurement or the one or more second burners based on the second temperature measurement.

2. The griddle of claim 1, wherein the controller automatically adjusts the plurality of valves.

3. The griddle of claim 1, wherein the controller automatically adjusts at least one of the plurality of burners by automatically adjusting an amount that at least one corresponding valve of the plurality of valves is open between the open position and the closed position.

4. The griddle of claim 1, wherein a central sensor of the one or more sensors is operable to measure a center of the first region of the griddle top.

5. The griddle of claim 1, further comprising:

a display, wherein the controller is further operable to:

output the first set temperature range and the first temperature measurement for the first region of the griddle top and the second set temperature range and the second temperature measurement for the second region of the griddle top for presentation with the display.

6. A method comprising:

obtaining a first temperature measurement of a first region of a griddle top and a second temperature measurement of a second region of the griddle top, the first temperature measurement and the second temperature measurement captured using one or more sensors;

obtaining a first set temperature range for the first region of the griddle top and a second set temperature range for the second region of the griddle top;

comparing the first temperature measurement to the first set temperature range and the second temperature measurement to the second set temperature range; and adjusting at least one of one or more first valves or one or more second valves between an open position and a closed position to control gas flow supplied to at least one of one or more first burners based on whether the first temperature measurement is within the first set temperature range or one or more second burners based on whether the second temperature measurement is within the second set temperature range, a first temperature of the first region of the griddle top maintained within the first set temperature range using the one or more first burners and a second temperature of the second region of the griddle top maintained within the second set temperature range using the one or more second burners.

7. The method of claim 6, wherein the one or more first valves and the one or more second valves are adjustable automatically.

8. The method of claim 6, wherein the first temperature measurement includes a central temperature measurement captured using a central sensor of the one or more sensors, the central temperature measurement corresponding to a center of the first region of the griddle top.

9. The method of claim 6, further comprising:

presenting the first set temperature range and the first temperature for the first region of the griddle top.

10. A system comprising:

a griddle including a griddle top, the griddle top including a plurality of regions, the plurality of regions including a first region and a second region;

a plurality of burners including one or more first burners and one or more second burners, the one or more first burners operable to heat the first region of the griddle top, the one or more second burners operable to heat the second region of the griddle top;

a plurality of valves in communication with the plurality of burners, each of the plurality of valves controlling gas flow to a corresponding burner of the plurality of burners, the plurality of valves including one or more first valves associated with the one or more first burners and one or more second valves associated with the one or more second burners;

one or more sensors operable to capture a first temperature measurement of the first region of the griddle top and a second temperature measurement of the second region of the griddle top; and a controller operable to control the plurality of burners by adjusting the plurality of valves between an open position and a closed position to control the gas flow supplied to the plurality of burners, the controller maintaining a first temperature of the first region of the griddle top within a first set temperature range by adjusting the one or more first valves, the controller maintaining a second temperature of the second region within a second set temperature range by adjusting the one or more second valves.

11. The system of claim 10, wherein the controller automatically adjusts the plurality of valves.

12. The system of claim 10, wherein the controller is in communication with a portable device, the controller controlling the plurality of burners based on input received from the portable device.

13. A system comprising:

a griddle including a griddle top including a first region and a second region;

a first burner operable to produce a first flame using gas supplied from one or more gas sources;

a second burner operable to produce a second flame using the gas supplied from the one or more gas sources;

a first additional burner operable to produce a third flame using the gas supplied from the one or more gas sources, the first flame and the third flame operable to heat the first region of the griddle top;

a second additional burner operable to produce a fourth flame using the gas supplied from the one or more gas sources, the second flame and the fourth flame operable to heat the second region of the griddle top;

an input system operable to obtain a first set temperature for the first region and a second set temperature for the second region;

a first valve and a first additional valve operable to maintain a first temperature of the first region of the griddle top according to the first set temperature, the first flame of the first burner controlled by moving the first valve between a closed position and an open position according to the first set temperature, the third flame of the first additional burner controlled by moving the first additional valve between the closed position and the open position according to the first set temperature; and a second valve and a second additional valve operable to maintain a second temperature of the second region of the griddle top according to the second set temperature, the second flame of the second burner controlled by moving the second valve between the closed position and the open position according to the second set temperature, the fourth flame of the second additional burner controlled by moving the second additional valve between the closed position and the open position according to the second set temperature.

14. The system of claim 13, wherein the input system includes a first input component associated with the first region and a second input component associated with the second region.

15. The system of claim 13, wherein the input system is configured to communicate with a with a portable device.

16. The system of claim 13, wherein the first valve is automatically adjusted based on the first set temperature and the second valve is automatically adjusted based on the second set temperature.

17. The system of claim 13, wherein one or more of the first valve, the first additional valve, the second valve, and the second additional valve are independently controllable.

18. A method comprising:

obtaining a first set temperature for a first region of a griddle top;

obtaining a second set temperature for a second region of the griddle top;

heating the first region of the griddle top by producing one or more of a first flame at a first burner and a first additional flame at a first additional burner using gas supplied from one or more gas sources;

heating the second region of the griddle top by producing one or more of a second flame at a second burner and a second additional flame at a second additional burner using the gas supplied from one or more gas sources;

maintaining a first temperature of the first region of the griddle top according to the first set temperature using a first valve and a first additional valve, the first flame of the first burner controlled by moving the first valve between a closed position and an open position according to the first set temperature, the first additional flame of the first additional burner controlled by moving the first additional valve between the closed position and the open position according to the first set temperature; and maintaining a second temperature of the second region of the griddle top according to the second set temperature using a second valve and a second additional valve, the second flame of the second burner controlled by moving the second valve between the closed position and the open position according to the second set temperature, the second additional flame of the second additional burner controlled by moving the second additional valve between the closed position and the open position according to the second set temperature.

19. The method of claim 18, wherein the first valve, the first additional valve, the second valve, and the second additional valve each independently move to a respective position between the open position and the closed position automatically.

20. The method of claim 19, wherein the respective position includes at least one of the open position, the closed position, or a partially open position.

* * * * *